May 27, 1952     R. A. BATTLES     2,598,100
VEHICLE SEAT CONVERTIBLE TO A BED
Filed Oct. 28, 1946     3 Sheets-Sheet 1

INVENTOR.
Ralph A. Battles
BY
Milton W. Lee
AGENT

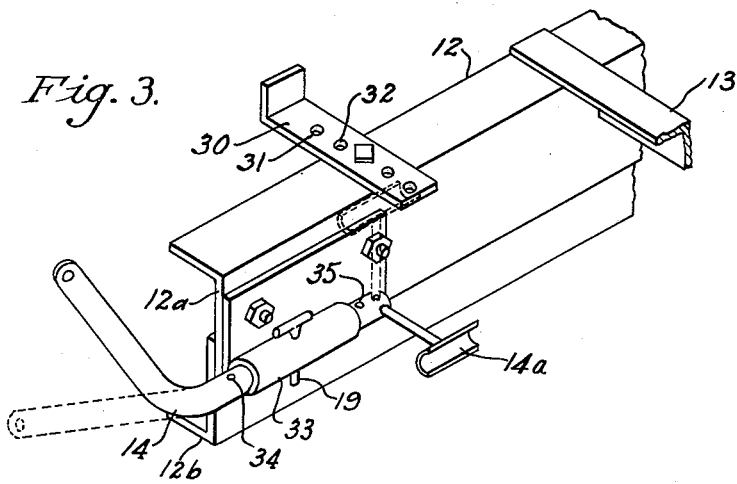
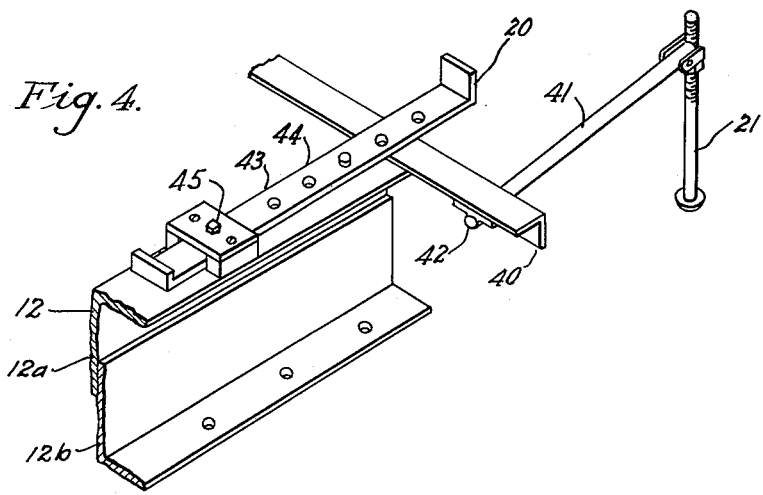
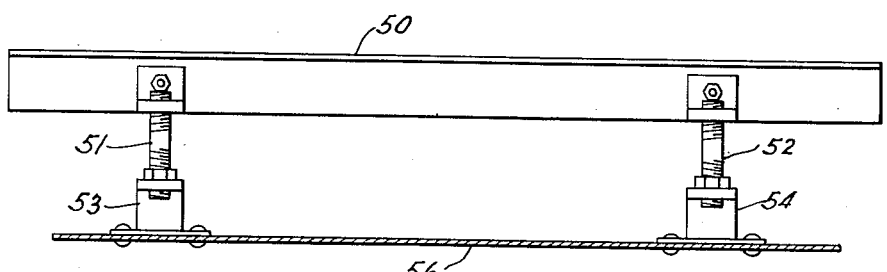

May 27, 1952  R. A. BATTLES  2,598,100
VEHICLE SEAT CONVERTIBLE TO A BED
Filed Oct. 28, 1946  3 Sheets-Sheet 3

INVENTOR.
Ralph A. Battles
BY
Milton W. Lee
AGENT

Patented May 27, 1952

2,598,100

UNITED STATES PATENT OFFICE 2,598,100

VEHICLE SEAT CONVERTIBLE TO A BED

Ralph A. Battles, El Monte, Calif., assignor of fifty per cent to Willis R. Battles, Redondo Beach, Calif.

Application October 28, 1946, Serial No. 706,203

7 Claims. (Cl. 155—7)

This invention relates to an adjustable vehicle seat particularly adapted to usage in automobiles. More particularly, the invention relates to a seat to be employed in conjunction with a second fixed seat, the first of such seats comprising a normally horizontal and a normally vertical member, the latter being positionable at substantially any angle between the normal and the horizontal, and in such latter position forming a substantially flat surface with the horizontal surfaces of the two seats.

The present application is directed to improvements in the apparatus described and illustrated in my co-pending application, Serial No. 647,068, which later became abandoned.

Flexibility in automobile design sufficient to permit usage thereof for comfortable travel and also for comfortable sleeping accommodations is becoming more and more desirable and will become increasingly so as leisure time is more plentiful. There have in the past been many ideas advanced for the design of automobile interiors which have contemplated the utilization of either the back or the front seat or both to form a bed within the automobile. In general, these ideas have been limited in their utility by the complexity thereof or due to the fact that they are suitable only if incorporated in an automobile at the time of manufacture, or again, only if employed in a particular make of automobile.

It is, therefore, an object of the present invention to provide a novel seat construction which may be converted to form a bed in the seating compartment of an automobile.

It is another object of this invention to provide means for converting a seat into a bed so that a minimum of space is occupied by the seat in its normal position.

A further object of the present invention is to provide means for pivoting the normally upright member of the front seat of an automobile so that it is capable of a total angular displacement of from about 75° to about 135°.

It is also within the contemplation of the invention to provide means for the accomplishment of the foregoing objects in relation to the great majority of automobiles of all makes and models, and to provide the hereinafter more clearly defined convertible seat in such a form that it may be quickly and easily substituted for the front seat of an automobile already in usage.

Further than this, the apparatus of the present invention is of such nature that it may be either permanently substituted for the existing front seat of an automobile or alternatively only temporarily substituted therefor. In addition, the apparatus herein described is of such flexible design that the existing front seat may be utilized in part or in whole in the construction of the convertible seat of this invention.

Other objects and advantages of the invention will become apparent upon the consideration of the following description and the accompanying drawings.

The great majority of automobiles are fitted at the present time with front seats that are adapted to swift and simple removal, and this characteristic is taken advantage of by my invention in the provision of an alternative convertible seat framework which may be readily substituted in the space of as little as five or ten minutes for the existing front seat.

Briefly, as described in my aforementioned copending application Serial No. 647,068, the invention comprises the structural elements necessary to furnish support for the horizontal and upright members of a front seat together with means for connecting the horizontal and upright members in such a manner that the latter may be converted to a horizontal member disposed between the horizontal members of the front seat and the back seat. In this way a substantially flat surface is formed by the three horizontal seat members on which surface a bed may be readily prepared.

The supporting framework for the horizontal member of the front seat comprises in its simplest elements an adjustable framework which is adjustable both in the direction of the transverse axis of the automobile body and in the direction of the longitudinal axis. The adjustable framework is provided with suitable means whereby it may be fastened directly to the floor of the automobile at any desired point, as, for example, at the point at which the existing front seat is fastened. In order to permit adjustment of the horizontal seat framework as a whole with respect to the longitudinal axis of the car, various means are provided whereby the framework is slidably attached to the above mentioned fastening means. This was accomplished in my above-identified co-pending application by providing the end members of the framework with slots through which the fastening means to stationary leg members could be inserted and connected to said end members at any place throughout the length of the slot. Additional means are hereinafter set forth wherein this longitudinal adjustibility of the horizontal seat may be accomplished.

Similarly an adjustable framework is provided for the normally upright member of the front seat which is also adjustable both in the direction of the transverse axis and of the vertical axis of the automobile. Connecting means in the form of one or more specially designed hinges was disclosed in my previous application, whereby the horizontal supporting means and the normally upright or substantially vertical supporting means were connected to each other in adjustable relationship. Additional means of accomplishing this adjustable connection between the horizontal and vertical seat members are disclosed in the present application as hereinafter more clearly set forth.

The structural members employed in the adjustable seat as herein set forth may be made from any type of comparatively strong structural material, such as any type of steel or other alloy, certain woods, laminated woods or the like, but I prefer to employ a cadmium plated steel or other comparatively rust proof material. With respect to the cushioning of the convertible seat herein set forth alternative procedures may be employed. If it is desired to permanently affix the convertible seat to the automobile it is generally possible if so desired to utilize the presently existing cushions of the front seat. If, on the other hand, it is desired to use the convertible seat only at occasional intervals, substituting it for the conventional front seat at these intervals, it is preferred to employ a different cushion thereon. In the event that it is desired to employ the cushions of the existing front seat in the convertible seat of the invention, it is possible to completely eliminate the necessity of a supporting framework for the upright member of the convertible seat inasmuch as the connecting means heretofore and hereafter set forth for connecting the upright and horizontal members of the convertible seat may be directly connected to the existing framework of a conventional upright member by providing slight modifications in the latter.

Whereas the foregoing and following description has had particular reference to the usage of the convertible seat of the invention in automobiles, it is to be understood that the same may find widespread application in other types of vehicles, such as trains, airplanes, steamships and the like.

A more lucid understanding of the invention may be had from the following detailed description thereof in relation to the accompanying drawing, in which:

Figure 3 is an isometric view of the rear portion of the inside structure of the horizontal seat support member;

Figure 4 is an isometric view of the front portion of the inside structure of the horizontal seat support member as it is when the horizontal seat is pushed forward in readiness for usage as a bed;

Figure 5 is an elevation view of one simple means of accomplishing vertical adjustability of the horizontal seat support member;

For convenience in describing the drawings, the horizontal and vertical seat members when so referred to are taken to mean the structural framework thereof. As pointed out above the cushions may form an integral part of the framework or may be detachably mounted thereon as desired, but in any case cushions as such, other than in their necessary relationship to the whole, form no part of this invention and are therefore excluded from the description wherever possible.

Further, it is to be understood in the following description that reference to the vertical seat member is not intended to imply a 90° relationship between this member and the horizontal seat member. In other words it is obvious that this vertical seat member may be, in its normal position, at any desired angle off of vertical, but is referred to as such in view of common conception thereof.

Figure 1:
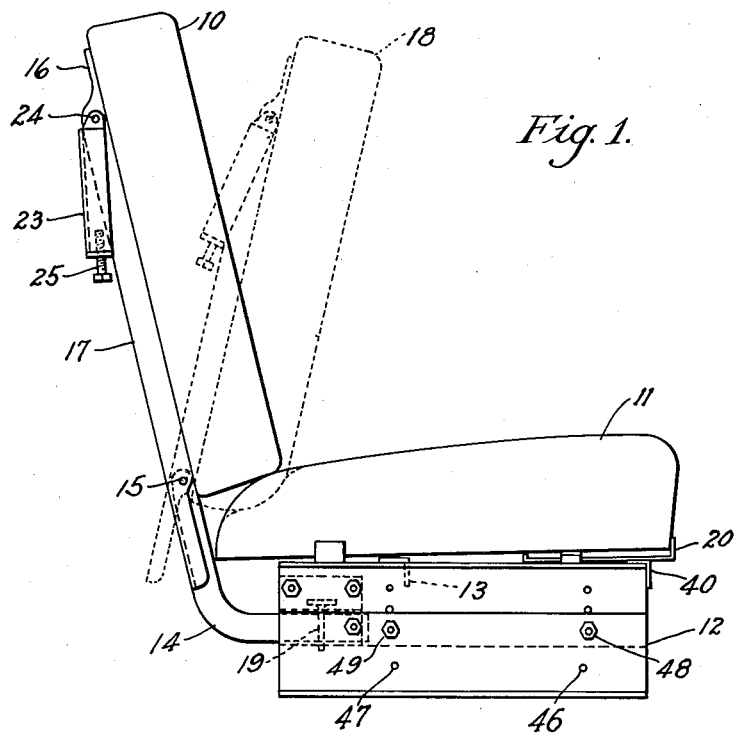
Figure 1 is an elevation of an assembled convertible seat structure adapted in this particular embodiment to usage in a two door sedan or club coupe.

Referring to Figure 1 there is shown a side view of one embodiment of the convertible seat of the invention in its normal position. The seat in Figure 1 is comprised of a vertical seat member 10 and the horizontal seat member 11. The horizontal member is supported on a framework 12 which is described in greater detail with reference to Figures 3 and 4. The framework 12 is constructed of two end pieces such as that shown in Figure 1 rigidly connected with each other by suitable cross beams such as beam 13. Projecting from the rear end of the support member 12 is the angular member 14, to which the vertical seat 10 is pivotally fixed at the point 15. The cushioned portion of the vertical seat 10 is supported by the framework 16 which comprises a vertical support 17 positioned at either end of the member 10 and connected to each other, if necessary, by suitable tie rods. Thus if the member 10 has its own framework, as may be the case if the existing seat back is to be utilized, the tie rods connecting the vertical support 17 with a similar member at the opposite end of the seat may be eliminated.

The lower portion of the vertical support 17 slips over and is pivotally affixed to the angular connecting member 14, and extends below this point as a semi-cylindrical extension in the manner shown. This particular method of affixing the vertical support 17 to the angular connecting means 14 is adapted to usage in two-door sedans or club coupes whereby, in the manner shown by the dotted lines 18 the entire vertical seat member 10 may be tilted forward about the pivot point 15. The angular displacement in this forward motion is limited only by the restrictions created by the two seat cushions. The semi-cylindrical extension of the vertical support member 17 prevents undesired displacement of the vertical seat member 10 in a backwards direction by abutting against the angular connecting member 14. This cut out of the member 17 is, of course, unnecessary when the seat is to be employed in a four door sedan for there is no need, in such case, for the forward displacement of the seat member.

In converting the seat shown in Figure 1 to a bed position, the pivot pin 15 is removed whereby the vertical and horizontal members are disengaged. The cotter pin 19 is removed permitting the rotation of the angular connecting member 14 to the position shown in Figure 2. The cushioned portion of the horizontal seat member 11 is raised up over the catch device 20 and extended out beyond the supporting member 12 in the manner shown in Figure 2. The supporting leg 21 is provided to maintain the forward part of the cushion at the desired elevation.

In the horizontal position the vertical seat member 10 falls between the front of the back seat 22 and the displaced position of the cushioned member of the horizontal seat 11. The front end of the vertical support 17 is adapted to rest on the cup support 14-a shown in Figure 3, which lies in a receptive position when the elbow 14 is rotated to the position shown in the dotted lines. Alternatively the member 17 may be provided with a second leg similar to leg 23 hereinafter described which may be pivotally mounted to the member 17 at a point adjacent to the pivot point 15. Yet another means for holding this member 17 while in a horizontal position, is to have a cup type support on the end of a threaded rod. Many other means may be employed for maintaining the level of the front part of the member 17 when it is in a horizontal position without departing from the principles of the invention.

The member 17 is further provided with an adjustable leg 23 to support the end thereof abutting against the rear seat when the seat member 10 is in the horizontal position. The adjustable legs 23 are pivotally mounted to the vertical supports 17 at a point 24 so as to remain in a substantially vertical position in either position of the member 10. This leg 23 and a corresponding leg located at the opposite end of the seat terminate in a threaded bolt 25 whereby the height of the seat member above the floor of the car 26 may be adjusted.

In Figure 3 there is shown a detailed view in perspective of the horizontal support member 12. The angle beam 13 represents one of the connecting means between the two identical end supports 12. The cleat 30 adapted to engage the outer edges of the seat cushion is provided with numerous holes 31, 32 etc., whereby the projection of the cleat 30 from the member 12 may be adjusted.

Figure 2:
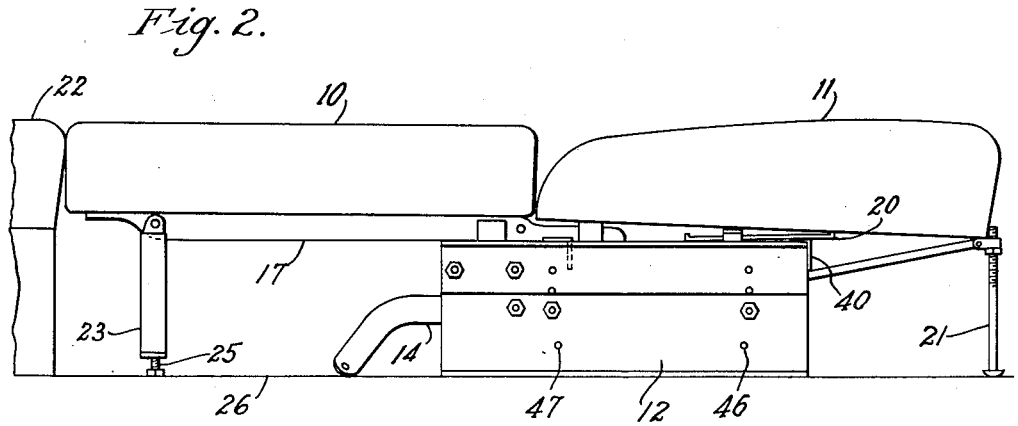
Figure 2 is an elevation of the seat shown in Figure 1 ready for usage as a bed.

The angular connecting piece 14 is shown mounted in the sleeve 33 affixed to the horizontal support 12. The member 14 is similarly provided with a number of transverse tap holes 34, 35 etc. whereby its longitudinal position with relation to the member 12 may be adjusted by the pin 19. By removing the pin 19 from the guide holes provided in the sleeve 33 the connecting arm may be pivoted as indicated by the dotted lines and as shown in Figure 2.

The forward portion of the horizontal support member 12 is shown in Figure 4 in perspective. The angle 40 connecting the two end members at their forward edges provides means for pivotally mounting the adjustable leg 21. The leg 21 is connected to the angle 40 by the arm 41 pivotally mounted to the connecting angle 40 at a point 42. When the seat is in normal position the arm 41 is pivoted so as to lie along the member 40. At the point of connection of the leg 21 with the arm 41 a threaded socket is provided adapted to engage the threading on the upper portion of the leg 21 whereby the height thereof may be adjusted.

The cleat 20 which holds the cushion in its normal position is provided with numerous holes 43, 44 etc. whereby it may be affixed to the number 12 by the bolt 45. The flexibility in this connecting means provides adaptability to various sized cushions.

As seen in Figures 3 and 4 the horizontal seat member 12 is constructed of two overlapping angular members 12-a and 12-b. Referring back to Figures 1 and 2 it will be seen that by providing numerous holes therethrough such as the holes 46, 47, etc. the angle pieces 12-a and 12-b may be affixed to each other by means of the bolts 48 and 49 in numerous varied positions, which provision lends flexibility in the height as well as the longitudinal displacement of the member 12. Numerous possibilities are apparent by provision of the proper holes in the members 12-a and 12b which may be placed in coincidence.

Another means of providing vertical adjustability of the horizontal supporting structure 12 is shown in end view in Figure 5. The upper portion of the horizontal support is indicated by the beam 50 which is mounted on two studs 51 and 52. The studs are in turn threaded into the legs 53 and 54 which are bolted to the car floor 56. By providing reverse threading on the upper and lower points of connection of the studs 51 and 52 the height of the member 50 may be conveniently varied by the rotation of these studs.

Figure 6:
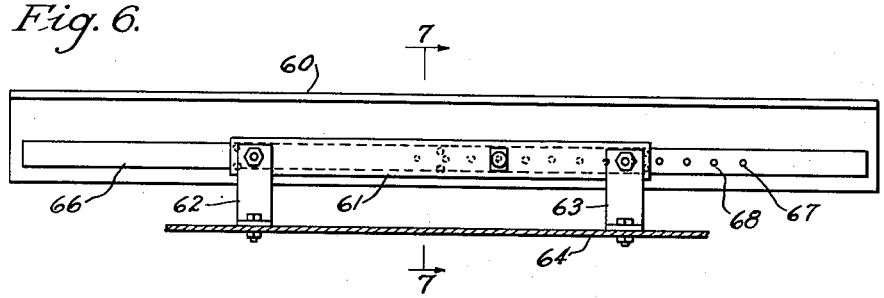
Figure 6 is an elevation view of a horizontal seat support member showing one means of accomplishing horizontal adjustability of the horizontal seat.
Figure 7:
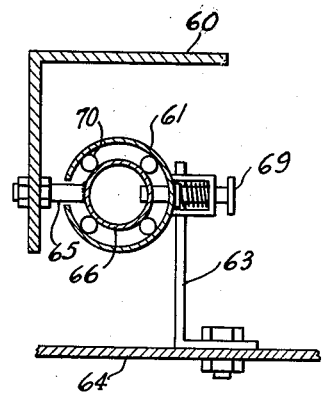
Figure 7 is a section taken along the line 7—7 of Figure 6.

Various means may be provided in addition to the plurality of connecting holes shown in Figures 1 and 2 to accomplish the longitudinal adjustment of the horizontal seat support member. In Figures 6 and 7 a method is shown involving the usage of concentric tubes longitudinally movable with respect to each other and spaced concentrically from each other by numerous ball bearings.

In Figure 6 the horizontal member 60 is shown coupled to the auxiliary member 61 which comprises a cylinder affixed to the supporting legs 62 and 63 which are bolted to the vehicle floor 64.

Referring to Figure 7 which is a section on the line 7—7 of Figure 6 the relationship of these members to each other may be more clearly seen. The horizontal support member 60 is affixed by means of the arm 65 to a tube 66 which is concentrically positioned within the outer tube 61 which is affixed to the legs 62 and 63, the latter showing in Figure 7. To provide means for maintaining the seat member 60 in stationary position the inner tube 66 is provided with numerous holes 67, 68 etc. adapted to receive a spring mounted pin 69 through an aperture in tube 61. By removing the pin 69 so as to disengage tubes 61 and 66 they may be moved longitudinally with respect to each other on the bearing elements 70 so as to vary the relative positioning of the member 60 with respect to the legs 62 and 63. At the desired position of the horizontal member 60 the pin 69 is released whereby it enters one of the holes 67, 68 etc. in the inner tube 66 so that the tubes 61 and 66 will remain in stationary relationship, thereby maintaining the member 60 at the desired position. The ease whereby one may shift the longitudinal position of the horizontal seat by merely pulling the pin 69 and exerting a minimum of forward or backward force on the seat is a result of the ball bearings positioned in the angular space between the runner tubes 61 and 66.

Figure 8:
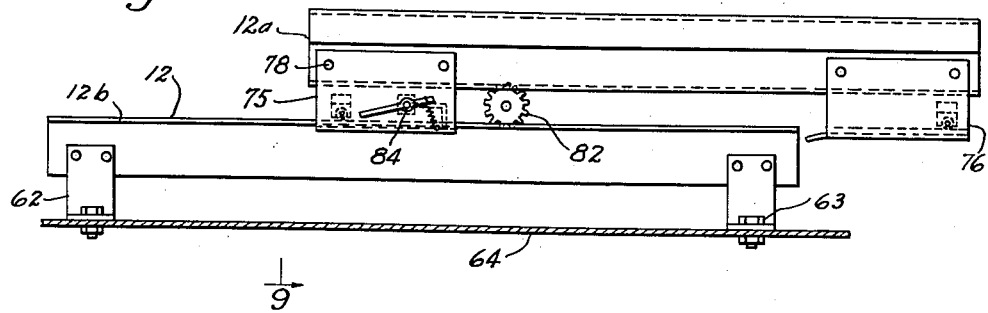
Figure 8 is an elevational view of a horizontal seat support member showing another means of accomplishing horizontal adjustability of the horizontal seat.
Figure 9:
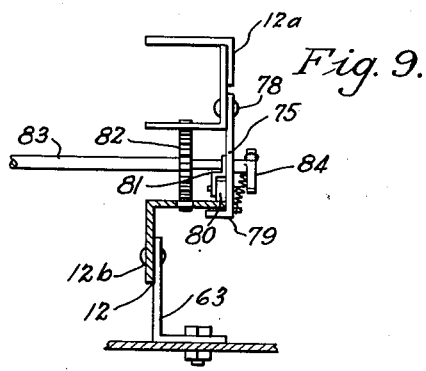
Figure 9 is a section taken along the line 9—9 of Figure 8.

Yet another means of accomplishing the longitudinal movability of the horizontal seat member is shown in Figures 8 and 9. Figure 8 is a side elevation of one end member of the horizontal seat support structure and Figure 9 is a section of the line 9—9 of Figure 8. Referring to Figures 8 and 9 there is seen the support structure 12 comprised of the upper and lower members 12-a and 12-b. The lower member 12-b is affixed to the floor 64 of the automobile by means of legs 62 and 63.

The two members 12-a and 12-b are affixed to each other by the cleats 75 and 76. These cleats are rigidly affixed to the upper member 12-a by suitable rivets, bolts or the like such as the rivet 78 and project over the runner beam of the member 12-b forming the cleat 79. The two members 12-a and 12-b are adapted to move with respect to each other on the roller 80 enclosed in the housing 81. The position of the seat members with respect to each other is controlled by the pinion gear 82 and an accompanying gear in the opposite horizontal seat member connected to the gear 82 by the tie rod 83. The lever 84 is provided on the outside of the housing of the roller 80 and is employed to control the relationship of the members 12-a and 12-b by locking the cleat 75 to the lower member 12-b. The lever 84 is spring loaded so as to permit easy engagement and disengagement as desired.

Many structural modifications may occur to those skilled in the art without departing from the scope of the foregoing discussion or of the following claims.

I claim:

1. In an automobile seat comprising a first cushion member, a second cushion member and means for mounting the first cushion member in a substantially horizontal position above the automobile floor, the improvement comprising a separate mounting means affixed at each end of the first cushion member, a separate rigid elbow mounted in each mounting means with an end of the elbow projecting rearwardly and upwardly from the mounting means, the second cushion member being removably and pivotally mounted to the upwardly extending ends of the elbows so as to be free to rotate toward the front of the automobile, and means for releasing the elbows in the mounting means so that when the second cushion member is detached from the elbows they will be free to rotate in the mounting means.

2. In an automobile seat comprising a first cushion member, a second cushion member and means for mounting the first cushion member in a substantially horizontal position above the automobile floor transversely in the automobile, the improvement comprising a separate tubular socket affixed at each end of the first cushion member parallel to the longitudinal axis of the automobile, a separate rigid elbow mounted in each socket and projecting rearwardly and upwardly, the second cushion member being removably and pivotally mounted to the extending ends of the elbows so as to be free to rotate toward the front of the automobile, and means for releasing the elbows in the socket so that they are free to rotate therein when said second cushion member is detached from the elbows.

3. In an automobile seat comprising a first cushion member and a second cushion member mounted transversely above the automobile floor, the improvement comprising a separate tubular socket affixed at each end of the first cushion member parallel to the longitudinal axis of the automobile, a separate elbow mounted in each tubular socket and extending rearwardly and upwardly therefrom the second cushion member being removably and pivotally mounted to the upwardly extending ends of the elbows so as to be free to rotate toward the front of the automobile but restricted against rotation toward the rear of the automobile, a plurality of legs pivotally mounted to the back of the second cushion member to support the member in a horizontal position off the floor when it is detached from said elbows, and means for releasing the elbows in the socket so that they will be free to rotate out of the way of the second cushion member when the member is detached from the elbows.

4. An automobile seat comprising a first cushion member, and a second cushion member mounted above the automobile floor, the improvement comprising a tubular socket affixed at each end of the first cushion member parallel to the longitudinal axis of the automobile, a separate rigid elbow mounted in each socket and extending rearwardly and upwardly therefrom, mounting means affixed at each end of said second cushion member, the mounting means being removably and pivotally mounted to the upwardly extending ends of the elbows and including means for preventing rotation of the second cushion member toward the rear of the automobile, and means for releasing the elbows in the socket so that they are free to rotate in the socket when the second cushion member is detached therefrom.

5. An automobile seat according to claim 4 wherein the means forming a part of said mounting means for preventing said second cushion member from rotating toward the rear of the automobile comprises an extension on each of the mounting means from the point of pivotal attachment thereof to the elbow and overlappin the elbow, the extension acting to abut against the elbow to prevent rearward rotation and to rotate away from the elbow during forward rotation of the second cushion member.

6. In an automobile seat comprising a first cushion member, a second cushion member and means for mounting the first cushion member in a substantially horizontal position above the automobile floor, the improvement comprising a separate tubular socket affixed at each end of the first cushion member parallel to the longitudinal axis of the automobile, the longitudinal axis of each tubular socket being parallel to the floor of the automobile, a separate rigid elbow mounted in each socket and extending rearwardly and upwardly therefrom, support means extending laterally from the end of each elbow adjacent the socket in such relation to the upwardly extending end of the elbow that when the elbow is rotated in the socket until the said upwardly extending end rests on the floor of the automobile the support means will project vertically from the elbow, separate mounting means affixed at each end of the second cushion member and detachably affixed in pivotal relationship to the upwardly extending ends of the elbows, and a plurality of legs pivotally mounted to the back of the second seat cushion and spaced from the point of mounting to the elbows, the arrangement being such that when the second seat cushion is detached from the elbows the elbows may be released in the sockets so as to be free to rotate until the said upwardly extending ends of the elbows rest on the automobile floor with the said support means projecting vertically from the elbows to cooperate with said legs to support the second cushion member in a horizontal position behind the first cushion member.

7. A vehicle seat comprising a framework adapted to be mounted in a substantially horizontal position above the floor of the vehicle, a seat cushion supported on said framework, a back rest cushion, a pair of supporting arms mounted to the back of the back rest cushion, a pair of spaced elbows mounted to the framework and extending rearwardly therefrom, means affixing the support arms to the elbows in detachable relationship so that the back rest cushion is held in an upright position adjacent the rear edge of the seat cushion when the elbows and support arms are affixed and is independent of the seat cushion when the support arms and elbows are not affixed to each other, and a plurality of legs pivotally mounted to the support arms.

RALPH A. BATTLES.

REFERENCES CITED

The following references are of record in the file of this patent:

UNITED STATES PATENTS

| Number | Name | Date |
| --- | --- | --- |
| 1,548,334 | Sebell | Aug. 4, 1925 |
| 1,701,417 | Minelli | Feb. 5, 1929 |
| 1,824,193 | Boringdon | Sept. 22, 1931 |
| 1,844,130 | Larsen | Feb. 9, 1932 |
| 1,846,443 | Swanson | Feb. 23, 1932 |
| 1,846,548 | Ginoung et al. | Feb. 23, 1932 |
| 1,875,588 | Golden | Feb. 23, 1932 |
| 1,877,769 | Knapp | Sept. 6, 1932 |
| 1,905,605 | Richardson | Sept. 20, 1932 |
| 1,952,376 | Knabusch | Mar. 27, 1934 |
| 2,297,176 | Thompson | Sept. 29, 1942 |
| 2,304,199 | Pinnow | Dec. 8, 1942 |